Nov. 12, 1935.  W. CAMERON  2,020,535
CAN TESTING MACHINE
Filed Aug. 9, 1930  5 Sheets-Sheet 5
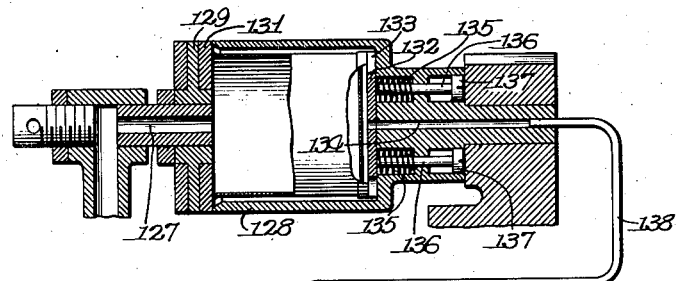
Fig.9.
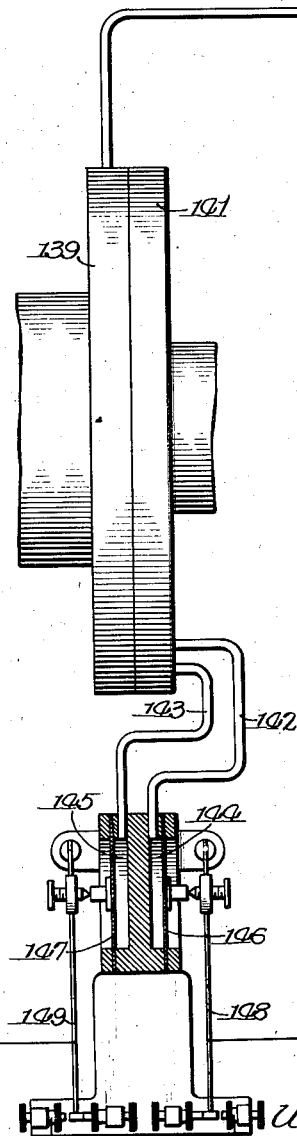
Inventor:
William Cameron
By: Wilson, Dowell, McCanna & Rehm
Attys.

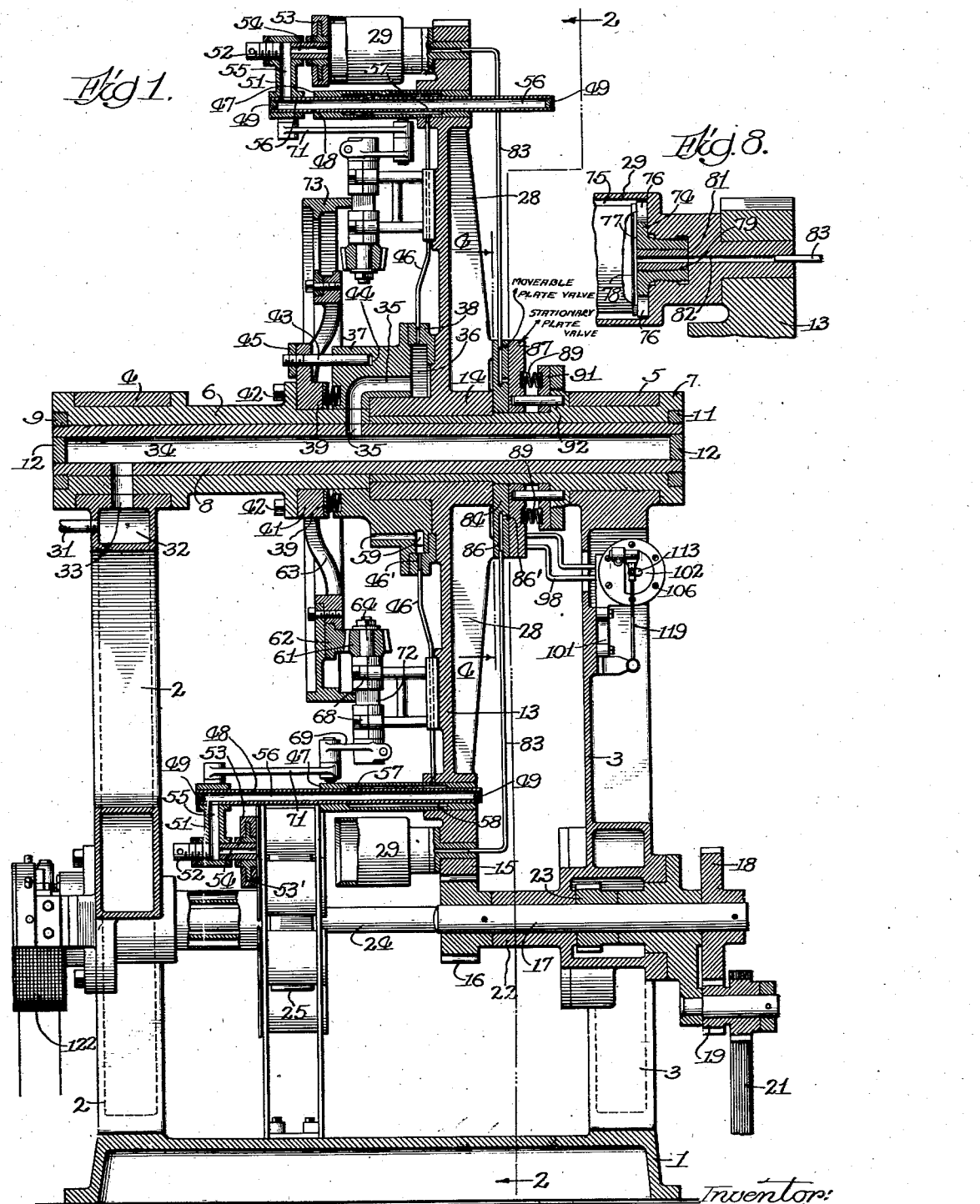

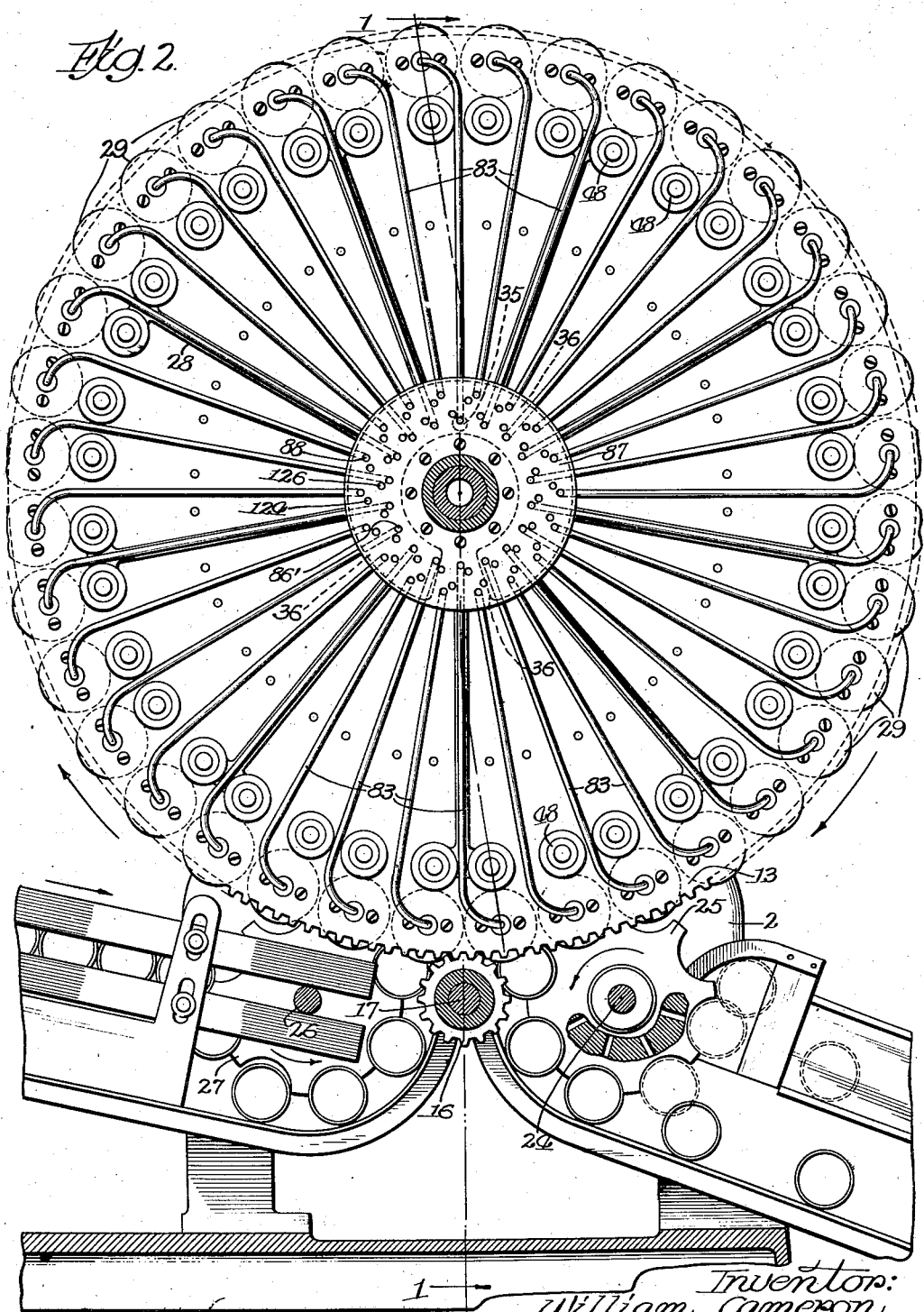

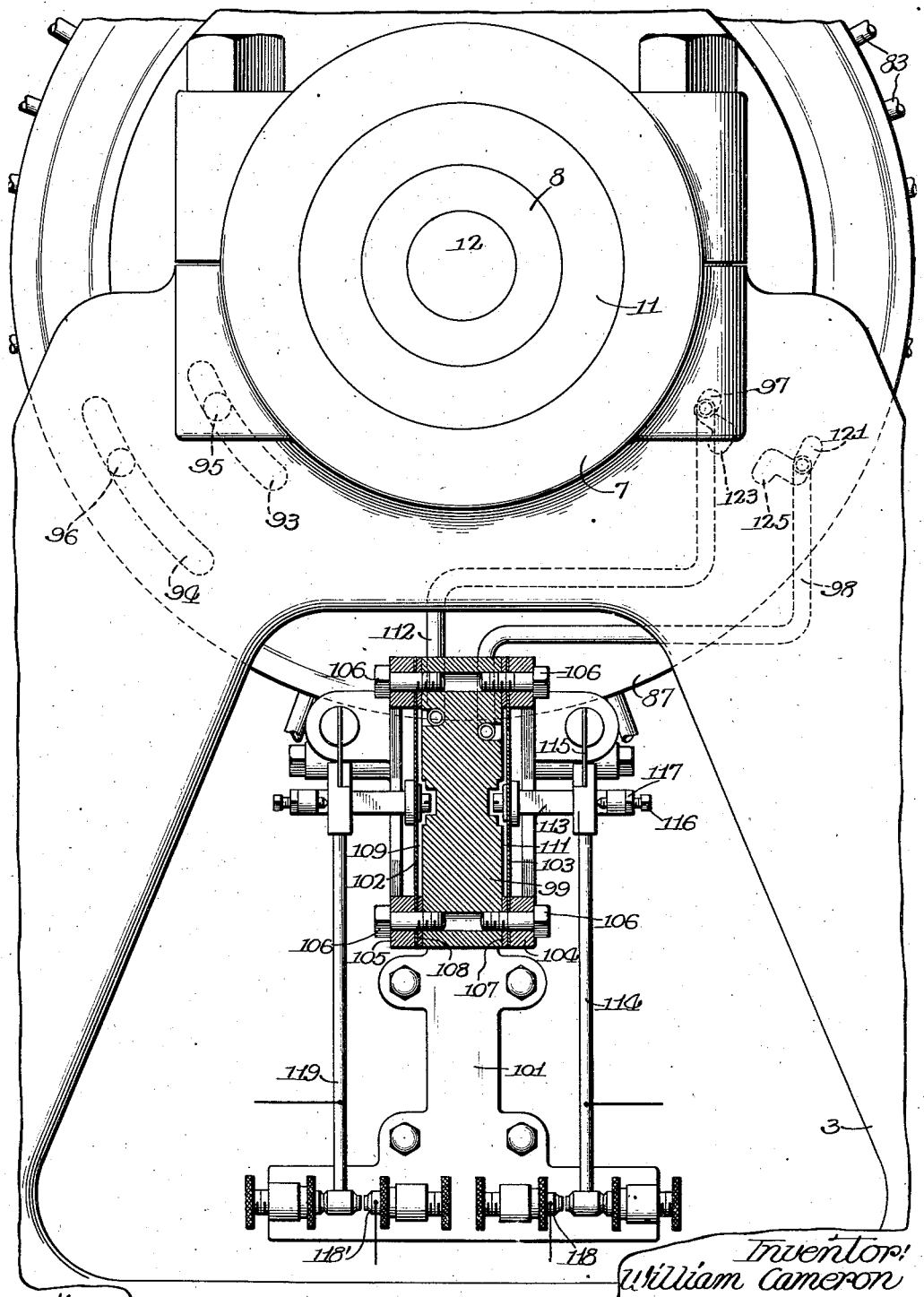

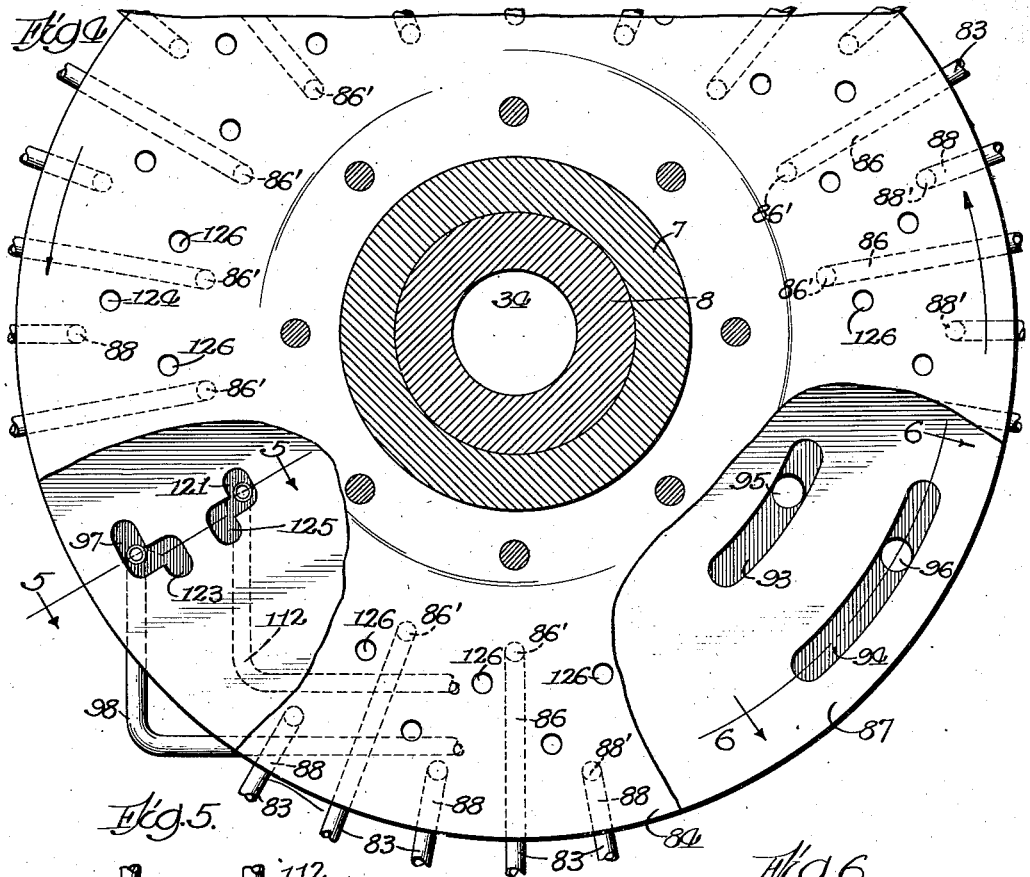

Patented Nov. 12, 1935

2,020,535

UNITED STATES PATENT OFFICE 2,020,535

CAN TESTING MACHINE

William Cameron, Chicago, Ill., assignor to Cameron Can Machinery Co., Chicago, Ill., a corporation of Illinois Application August 9, 1930, Serial No. 474,235

5 Claims. (Cl. 73—51)

This invention relates in general to testing machines and particularly machines for testing can bodies to determine whether or not the bodies are leak proof.

Can bodies have heretofore been tested by applying either air pressure or a vacuum to the interior thereof, and the change in pressure or vacuum, as the case might be, within the interior of the can body resulting from a leak in the body was utilized to actuate mechanism for separating the leaky bodies from the good bodies.

To diminish the pressure on the interior of a can body sufficiently below atmospheric pressure or to increase the interior pressure to sufficiently above atmospheric pressure to operate a leak detecting and can separating mechanism has been found in the past to require a substantial time interval as well as a considerable expense in the necessary pneumatic equipment because of the cubical content of the cans ordinarily being tested. The time interval required for establishing a satisfactory test in either of the above mentioned modes would naturally tend to be increased with the increase in size of the can bodies and would be a factor in every instance tending to retard the speed of testing.

One of the objects of this invention is to provide an apparatus in which the leak detecting mechanism is made responsive not to pressure variations on the inside of the can bodies as was the prior practice but to pressure variations in a confined space outside of the can body of much smaller capacity than the can body volume.

Other objects of the invention are to provide means for attaining the first mentioned object with a maximum of accuracy and speed in an apparatus constructed to function efficiently with the minimum of maintenance expense.

Other numerous objects of my invention which are inherently possessed by it should become apparent upon a perusal of this specification and the drawings which form a part hereof.

In the drawings:

Fig. 1 is a vertical sectional view of a can testing machine embodying my invention taken on the line 1—1 of Fig. 2, Fig. 2 is an end elevation on line 2—2 of Fig. 1, Fig. 3 is a partial end elevation of the machine as viewed from the right end of Fig. 1 showing in section a portion of the leak detecting mechanism, Fig. 4 is a section on the line 4—4 of Fig. 1, Fig. 5 is a sectional view on the line 5—5 of Fig. 4, Fig. 6 is a sectional view on the curved line 6—6 of Fig. 4, Fig. 7 is a diagrammatic illustration of the electrical circuits responsive to the leak detecting mechanism and for actuating the can selecting mechanism, Fig. 8 is an enlarged sectional detail view of a can pocket, and Fig. 9 is a somewhat diagrammatic description of a modified form of the leak detecting mechanism.

Referring now to the drawings the machine is provided with a base 1 on opposite sides of which are mounted standards 2 and 3 which at their upper ends provide bearings 4 and 5. The bearing 4 carries a stationary tubular sleeve 6 while the bearing 5 carries a stationary tubular sleeve 7, the two sleeves being rigidly aligned and connected together by a hollow shaft 8 and clamping nuts 9 and 11. The ends of the hollow shaft 8 are closed with suitable plugs 12. A rotatable carrier for the can bodies while they are being tested is provided in the form of a large disc wheel generally indicated as 13 which is rotatably mounted upon the inner end of the shaft 7 where the hub 14 of the disc wheel bears thereon. On the perimeter of the disc wheel 13 there is provided a large ring gear 15 by which rotary motion is imparted to the carrier by means of a spur gear 16 in mesh with the ring gear and driven by the shaft 17 on which is secured a second gear 18 in mesh with the gear 19, the latter being driven in any suitable manner as for example by a sprocket chain 21 connected preferably with an electrical motor (not shown).

The shaft 17 is suitably supported in the standard 3 by a bearing 22 and carries furthermore a gear 23 which through suitably connected gears (not shown) drives the shaft 24 on which is mounted the discharge wheel 25. Another suitable train of gears (not shown) connected with the gear 23 enables that gear to drive a shaft 26 (see Fig. 2) on which is fixed the feed wheel 27.

The rotatable carrier is comprised of a disc 13 and radial reinforcing webs 28. Near the perimeter of the disc there is mounted a plurality of can body pockets 29 into which the cans are placed for pneumatic testing. The mechanism for inserting the cans into the pockets and withdrawing them will now be described.

A pump, not shown, but which may be any pump suitable for the purpose places a partial vacuum through a pipe 31 on the hollow interior 32 of the standard 2 (see Fig. 1). The interior of the hollow standard is connected by means of a passage 33 with the passage 34 in the hollow shaft 8. Another passage 35 connects the vacuum system with a chamber 36 which is provided between the stationary block 37 and the cup-shaped plate 38. The plate 38 is secured in any suitable manner, not shown, to the disc 13 and rotates therewith during the operation of the machine. The block 37 is held in sliding contact with the plate 38 by means of a plurality of compression springs 39 which abut against the collar 41, the collar 41 being secured by screws 42 to the sleeve 6. In order to prevent the block 37 from rotating, one or more pins 43 extend through the collar 41 and are slidably disposed in a recess 44 in the block 37. The pin 43 is threaded to the collar 41 and a lock nut 45 is employed to lock it in position. The chamber 36 which consists of cooperating recesses in the block 37 and plate 38 extends annularly about the hub 14 of the carrier and is so constructed and shaped as to establish communication between the source of vacuum and any tube 46 thereby, in cooperation with other parts of the mechanism, applying vacuum to the interior of each can disposed on the carrier from the time the can is deposited in the carrier until just before it is discharged from the carrier. The approximate extent and cross sectional shape of the vacuum chamber 36 is indicated by dotted lines in Fig. 2.

Adjacent each can pocket 29 and suitably supported in the carrier disc 13 there is a hollow sleeve 47 in which is slidably disposed a hollow shaft 48. The opposite ends of the shaft 48 are sealed with suitable plugs 49. Rigidly mounted on one end of the shaft 48, as shown, is a chuck head 51 which carries a hollow rod 52 on which is mounted a chuck 53, the face 53' of which is covered with rubber or any other suitable resilient material suitable for establishing a tight sealing contact with the open end of a can body and the open end of the can pocket. Passages 54, 55 and 56 are in communication with each other and through the port 57 and shaft 48 connect the chuck with the tube 46 by means of the annular passage 58 so that when any tube 46 is in communication with the vacuum chamber 36 the vacuum will be applied to the chuck. When the rotation of the carrier disc has carried any one of the tubes 46 beyond the limits of the annular vacuum chamber 36 such tube will, through its passage 46', communicate with the passage 59 directly to the atmosphere and thus relieve the vacuum at the chuck. This would be the condition desired at the time of releasing a can body and discharging it from the carrier.

When a can has been conveyed into the carrier and aligned in front of one of the can pockets 29 suction is applied at the suction head through the above described passages and vacuum chamber 36 and at the same time the bevel gear 61 becomes engaged with a rack 62, which is suitably supported by a bracket 63 upon the collar 41 and, since the rack is stationary and the bevel gear 61 travels with the carrier disc, the gear will be caused to rotate. The gear 61 is mounted on a shaft 64 journaled in bearings 68 and on the other end of the shaft is rigidly fixed a crank arm 69. This crank arm is pivotally connected with a connecting rod 71, the latter being in turn pivotally connected with the chuck head 51. The rack 62 is one of two segmental racks better shown in my copending application Serial No. 331,845, filed January 11, 1929. One of the racks 62 is positioned to the left of the vertical center line of Fig. 2 to engage one of the bevel gears 61 immediately after the chuck associated with that bevel gear has pneumatically gripped a can body. The resulting rotation of the gear 61 will then cause the connecting rod 71 to move the hollow shaft 58 to the right, as viewed in Fig. 1, and introduce the can body into the associated can pocket. The other segmental rack 62 is positioned to the right of the vertical center line of Fig. 2 to engage each bevel gear 61 as it comes around to that position to rotate the same and withdraw the associated can body from the can pocket preparatory to its discharge from the testing machine. Between the positions occupied by the racks each shaft 64 is held against accidental rotation by means of the sliding contact of its cam follower 72 against the ring 73. Details of the construction of the cam follower, ring and racks are better shown in my aforesaid copending application.

With vacuum applied to the interior of each can which is reposing in a can pocket during almost the entire period of its retention in the rotatable carrier any leak however slight can be detected by means of the following described mechanism. Each can pocket will be constructed to be only slightly larger than the can which is to be tested in it. As shown in Fig. 8 the can when inserted into the pocket 29 will have its bottom placed against a plate 74 at the bottom of the pocket and will very nearly fill the can pocket, leaving however a small chamber 75 outside of the can body for a purpose about to be described. The margins of the plate 74 will be provided with flutes 76 at intervals to provide communication between the chamber 75 at the lateral sides of the can body and the space 77 between the bottom 78 of the can body and the face of the plate 74. The plate 74 is screwed into the base of the can pocket and a hollow tube 79 is threaded through the central passage in the plate 74 until its end abuts against the shoulder 81 in the can pocket, thus locking the plate 74 firmly in position. By means of the threads provided on the tube 79 and the plate 74 it is apparent that the plate 74 may be adjusted outwardly somewhat from the position shown in Fig. 8 and locked in that position if it is desired to accommodate the testing of a can of somewhat less height than usual. With the parts locked in the position shown in Fig. 8 each passage 82 is in communication with the spaces 77 and 75 and communicates with a tube 83, the latter being connected to a movable plate 84 and with a radial passage in the movable plate. Alternate tubes are connected to short and long passages, the long passages 86 being shown in cross section in Fig. 1, the offset portion of each of these having an aperture 86' which communicates with the face of the stationary plate 87. The tubes which are not connected to the longer passages 86 are connected to shorter passages 88 (see Fig. 4), these passages having apertures 88' which in turn communicate with the face of the stationary plate valve 87. The valve 87 is held in sliding contact with the plate valve 84 by means of a plurality of compression springs 89 which abut against the stationary plate 91, the plates 87 and 91 being held against rotation by means of a pin 92 which extends into the sleeve 7.

Referring now to Figs. 4 and 6, the stationary plate valve 87 is provided with a pair of arcuate recesses 93 and 94 which are constantly in communication respectively with passages 95 and 96 which are open to the atmosphere. The purpose of these recesses is to establish atmospheric pressure within each can pocket surrounding the can body shortly after a can body has been placed in the testing machine. This is accomplished as follows. The recesses are so placed that as the carrier wheel rotates the apertures 86' and 88' which are connected with the tubes 83 will successively be brought into communication with these recesses, the apertures 86' registering with recess 93 and the apertures 88' registering with recess 94. When this registration is accomplished and while it is being maintained the space surrounding each can body will be in direct communication through tube 83 with the atmosphere thus establishing atmospheric pressure about each can body. It will be noted from Fig. 4 that these recesses will communicate with each can pocket shortly after the can body has been fed into the machine so that atmospheric pressure is established outside each can body at the beginning of the testing interval. As soon as the apertures 86' and 88' pass beyond the recesses 93 and 94 these apertures will become sealed against the unbroken surface of the stationary plate 87 and if a leak in the can body should tend to draw air into the interior of the can body there will be a resultant decrease below atmospheric pressure in the space within the can pocket immediately surrounding the can body.

Assuming that the can pocket tube 83 leading from any can pocket has passed beyond the recess 94 and finally comes around to the position of the recess 97 in the stationary plate 87 communication will immediately be established from the tube 83, through the passage 88, aperture 88', recess 97 and tube 98 to the leak detector mechanism best shown in Fig. 3. This mechanism comprises a block 99 secured by the bracket 101 to the frame member 3 of the machine having on either side of it circular diaphragms 102 and 103 which are secured by means of clamps 104, 105 and the bolts 106 against the respectively associated annular shoulders 107 and 108 thereby forming inwardly of the diaphragm the sealed chambers 109 and 111. The tube 98 connects with the chamber 111 while a tube 112 of corresponding function communicates with the chamber 109. Rigidly secured to the diaphragm 103 is a post 113 the outer end of which extends around a pendulum contactor 114. This contactor is suspended by a thin strip 115 of any suitable flexible material such as steel and is intended to permit the contactor to be held vertically normally but capable of free movement in response to the motion of the diaphragm 103. A set screw 116 provided with a lock nut 117 is advanced until its point just touches the side of the contactor. Should a slight leak in a can body cause a decrease in pressure in the small space immediately surrounding the can body in the pocket as soon as the associated can pocket tube 83 establishes communication with the tube 98 through the recess 97 this pressure decrease will cause the diaphragm 103 to move to the left as viewed in Fig. 3 and thus bring the contactor 114 into contact with the binding post 118 to thereupon establish a circuit for operating the selector mechanism which separates leaky can bodies from good can bodies. The construction of the pendulum contactor 119 and the mechanism associated therewith is identical with the construction of the mechanism associated with the contactor 114, as is obvious upon inspection of Fig. 3. The tubes 98 and 112 and the corresponding recesses 97 and 121 are provided so that can bodies in the alternate pockets associated with apertures 86' and 88' may be tested and so that if the can bodies are leaky they may operate in quick succession the necessary selector mechanism for separating them from the good bodies. Fig. 7 shows diagrammatically the electrical circuits employed for actuating the magnet 122 which sets in motion the selector mechanism. The recess 97 is provided with an offset portion 123 so shaped that immediately following the registration of any aperture 88' with the recess 97 a second aperture 124 which extends through the movable plate 84 to the atmosphere will come into registration with the offset portion 123 of this continuous recess and restore atmospheric pressure to the chamber 11 through the tube 98. Likewise the recess 121 has an offset portion 125 which will register with any of the apertures 126 following the registry of the preceding aperture 86' to restore atmospheric pressure to the chamber 109 inside of the diaphragm 102. Restoration of atmospheric pressure to the chambers 109 and 111 will of course restore the associated pendulum contactors to their vertical position, inasmuch as the outside surface of each diaphragm is constantly exposed to atmospheric pressure.

The selector mechanism, just above referred to, for separating leaky can bodies from good can bodies does not form a part of the invention disclosed in this application but is fully described in my copending application Serial No. 331,845, filed January 11, 1929, being illustrated particularly in Figs. 9, 15, 16, 17, 18, 19, 20, 21, 22, 23, 24 and 25 thereof. Note that the magnet 122 shown in this application in Fig. 7 corresponds in function and operation to the magnet 154 in my prior application and the remainder of the mechanical equipment for separating the good and bad can bodies is the same.

The mechanism for feeding can bodies into this testing machine and the mechanism for taking away both the good and the bad can bodies does not form a part of this invention, and may be any suitable mechanism, being preferably that which is shown in my aforesaid copending application.

The device operates as follows, briefly. As soon as a can is delivered by the feed wheel up into position in front of a chuck 53 the suction tube 46 associated with that chuck becomes rotated into a position where it registers with the vacuum chamber 36, thus applying suction to the chuck which will thereupon grip the can pneumatically at the same time the segmental rack 62 will set into operation the chuck reciprocating mechanism and propel the can body into the associated can body pocket 29. The space surrounding the can body will at this time be open to atmosphere through the can pocket tube 83 and the recess 93 or 94. Immediately thereafter the space surrounding each can body will be sealed from the atmosphere by the relative movement of the plate valves 84 and 87 and the vacuum being produced on the inside of the can body will begin to test the can body for leaks. Should the body be leaky the space surrounding the can body will have its pressure resultingly decreased below atmospheric pressure and when the can pocket tube 83 registers either with the recess 97 or 121 this decrease below atmospheric pressure will be transmitted to the proper diaphragm either 102 or 103 and close either the contact 118 or the contact 118' to set in motion the selector mechanism, the latter being fully described in my aforesaid copending application.

A modification of part of the invention is shown in Fig. 9. In this modification, instead of applying vacuum to the inside of a can body positive pressure is applied through the passage 127 to the interior of the can body which is being held in a can pocket 128. The face of the chuck 129 is provided with a resilient surface 131 made of rubber or some suitable material for simultaneously sealing the open end of the can body and the open end of the can pocket. In this instance a bottom plate 132 is provided in the pocket with fluted edges 133 which establish communication between the space outside of the can body laterally of the sides of the can and also at the bottom of the can with the passage 134. The plate 133 is movable, being normally urged outwardly from the bottom of the can pocket by compression springs 135 which surround the guide pins 136, the latter being provided with heads 137. A can pocket tube 138 will connect the space surrounding each can body to a passage, not shown, in the movable plate valve 139. The movable plate valve and the stationary plate valve 141 are identical in construction with the plate valves 84 and 87 heretofore described and the functioning of these valves and their passages is the same. It is intended that the tubes 138 extending from these can pockets will be connected to long and short passages in the movable plate valve just as is the case in the foregoing described preferred embodiment. Hence two tubes 142 and 143 will lead from the stationary plate valve 141 and will communicate with the sealing chambers 144 and 145 which exist in the inside surface of the diaphragms 146 and 147. Obviously if a leak should occur in a can body tested by this modification the positive internal air pressure will raise the pressure in either chamber 144 or 145 and cause the diaphragms to be distended, swinging the associated contactors 148 or 149 outwardly to close the electrical circuits for energizing the selector mechanism magnet. It will be apparent how this modified portion of the invention cooperates with the remainder of the testing machine without description thereof.

It should be understood that the invention herein disclosed is susceptible of embodiment in various modifications within the spirit and scope of the appended claims.

Having shown and described my invention, I claim:

1. In a can body testing machine, the combination of a movable carrier provided with a series of testing receptacles each adapted to loosely receive a can body to be tested, means for introducing a body into each receptacle, means for sealing each receptacle and the body therein to produce a sealed chamber surrounding each body under atmospheric pressure, means for producing within the can body pressure other than atmospheric pressure, a leak detecting mechanism comprising a plurality of diaphragms each forming a closure for an air chamber, the outer face of each diaphragm being subjected to atmospheric pressure, conduit means arranged to establish communication between each of said air chambers and alternate ones of said testing chambers and including a rotary valve controlling the establishment of such communication in predetermined timed relation, and means adapted to be actuated by either of said diaphragms, when pressure other than atmospheric is transmitted from a testing chamber to one of said air chambers, whereby the leaky can body in the chamber thus indicated is separated from the remaining bodies.

2. In a can body testing machine, the combination of a movable carrier provided with a series of testing receptacles each adapted to loosely receive a can body to be tested, means for sealing each receptacle and the body therein to produce a sealed chamber surrounding each body under atmospheric pressure, means for producing within the can body pressure other than atmospheric pressure, a leak detecting mechanism comprising a plurality of diaphragms each forming a closure for an air chamber, the outer face of each diaphragm being subjected to atmospheric pressure, conduit means arranged to establish communication between each of said air chambers and alternate ones of said testing chambers and including a rotary valve controlling the establishment of such communication in predetermined timed relation, and means adapted to be actuated by either of said diaphragms, when pressure other than atmospheric is transmitted from a testing chamber to one of said air chambers, whereby the leaky can body in the chamber thus indicated is separated from the remaining bodies.

3. In a can body testing machine, the combination of a movable carrier provided with a series of testing receptacles each adapted to loosely receive a can body to be tested, means for sealing each receptacle and the body therein to produce a sealed chamber surrounding each body, means for producing within the can body pressure other than atmospheric pressure, a leak detecting mechanism comprising a plurality of diaphragms each forming a closure for an air chamber, the outer face of each diaphragm being subjected to atmospheric pressure, conduit means arranged to establish communication between each of said air chambers and alternate ones of said testing chambers and including a rotary valve controlling the establishment of such communication in predetermined timed relation, said valve having provision for temporarily opening each testing chamber to atmosphere after the establishment of a non-atmospheric pressure within the body disposed within said chamber, and means adapted to be actuated by either of said diaphragms when pressure other than atmospheric is transmitted from a testing chamber to one of said air chambers whereby the leaky can body in the chamber thus indicated is separated from the remaining bodies.

4. In a can body testing machine, the combination of a movable carrier provided with a series of testing receptacles each adapted to loosely receive a can body to be tested, means for sealing each receptacle and the body therein to produce a sealed chamber surrounding each body, means for producing within the can body pressure other than atmospheric pressure, a leak detecting mechanism comprising a plurality of expansible air chambers, conduit means arranged to establish communication between each of said air chambers and alternate ones of said testing chambers and including a rotary valve controlling the establishment of such communication in predetermined timed relation, said valve being provided with means cooperating with said conduit means for venting each testing receptacle to atmosphere prior to the establishment of communication between such receptacle and said detecting mechanism, and means adapted to be actuated by either of said air chambers, when pressure other than atmospheric is transmitted from a testing chamber to one of said air chambers, whereby the leaky can body in the chamber thus indicated is separated from the remaining bodies.

5. In a can body testing machine, the combination of a movable carrier provided with a series of testing receptacles each adapted to loosely receiving a can body to be tested, means for sealing each receptacle and the body therein to produce a sealed chamber surrounding each body under atmospheric pressure, means for producing within the can body pressure other than atmospheric pressure, a leak detecting mechanism comprising a plurality of expansible air chambers, conduit means arranged to establish communication between each of said air chambers and alternate ones of said testing chambers and including a rotary valve controlling the establishment of such communication in predetermined timed relation, and means adapted to be actuated by either of said air chambers, when pressure other than atmospheric is transmitted from a testing chamber to one of said air chambers, whereby the leaky can body in the chamber thus indicated is separated from the remaining bodies.

WILLIAM CAMERON.